United States Patent [19]
Culbertson

[11] 3,848,717
[45] Nov. 19, 1974

[54] CLUTCH ACTUATING MECHANISM

[75] Inventor: George W. Culbertson, Oconomowoc, Wis.

[73] Assignee: FMC Corporation, San Jose, Calif.

[22] Filed: Dec. 20, 1972

[21] Appl. No.: 316,774

[52] U.S. Cl. .............. 192/93 A, 192/70.23, 192/96
[51] Int. Cl. .......................................... F16d 19/00
[58] Field of Search ............. 192/93 A, 70.23, 89 A, 192/97, 96, 115

[56] References Cited
UNITED STATES PATENTS

| | | | |
|---|---|---|---|
| 1,207,542 | 12/1916 | Gustafson | 192/97 |
| 2,699,851 | 1/1955 | Eastman | 192/97 |
| 2,848,086 | 8/1958 | Warsaw | 192/93 A |
| 2,853,166 | 9/1958 | Campbell | 192/93 A |
| 3,386,545 | 6/1968 | Hansen | 192/18 R |

Primary Examiner—Samuel Scott
Assistant Examiner—Allan Russell Burke
Attorney, Agent, or Firm—F. W. Anderson; C. E. Tripp

[57] ABSTRACT

A plurality of elongate pins disposed in the slots of a spline shaft radially inwardly of a sprocket, that is to be driven, is arranged to transmit the thrust of a rotary camming mechanism, disposed on one side of the sprocket, to the friction discs of a disc-type clutch disposed on the other side of the sprocket.

4 Claims, 3 Drawing Figures

PATENTED NOV 19 1974 3,848,717
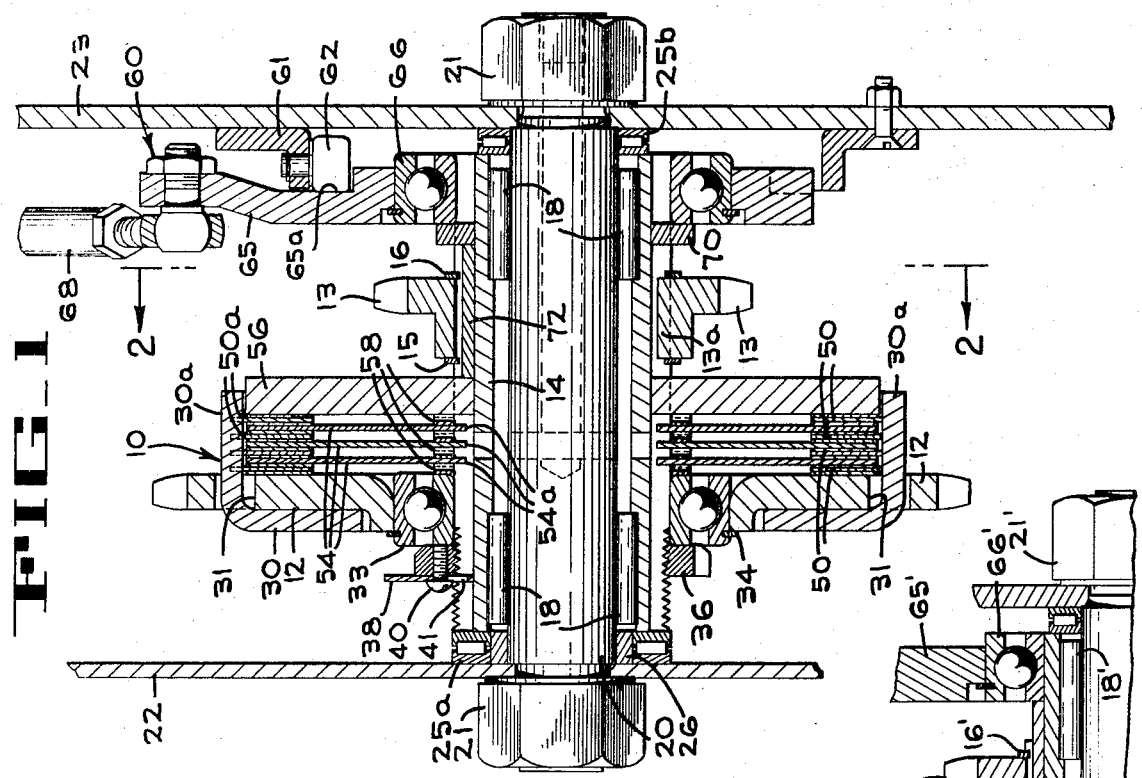
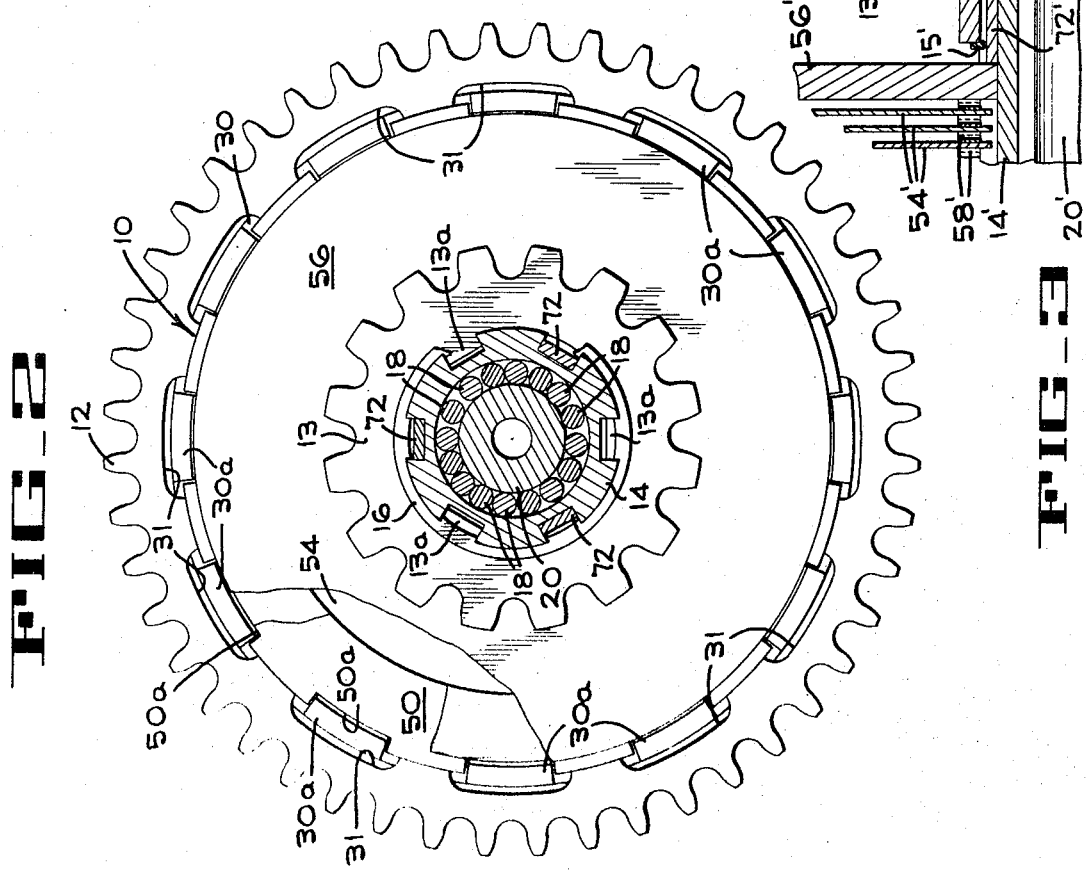

CLUTCH ACTUATING MECHANISM

BACKGROUND OF THE INVENTION

Friction clutches of the type with which the actuating mechanism of the present invention is adapted to be used are disclosed in the U.S. Pat. Nos. to Hansen No. 3,127,969 and to Tiedemann No. 2,827,994. In such clutches, a rotary actuating mechanism imparts an axial movement to a thrust member which operatively engages the friction members of the clutch and moves them into tight frictional driving engagement. Heretofore, the axially moving thrust member has been a relatively large thrust collar or washer which filled the space between the rotary actuating mechanism and the discs preventing the mounting of a sprocket to be driven at this point. If a driven sprocket was disposed between the actuating mechanism and the friction discs, it would have to partake of the axial movement of the rotary actuating member. It is evident, of course, that axial movement of a sprocket is undesirable since it adversely affects the training of the chain over the sprocket. In the U.S. Pat. to Hansen No. 3,386,545, push rods are disclosed for transmitting the force of a spring loaded pressure plate of a brake to a clutch disc unit, however, no driven sprocket is in the disclosed mechanism and the use of pressure pins to transmit motion without axial movement of a sprocket is not suggested.

Accordingly, it is an object of the present invention to provide an improved clutch actuating mechanism featuring slidable pressure pins disposed in slots in a spline shaft.

SUMMARY OF THE INVENTION

In one preferred embodiment of the invention, the clutch actuating mechanism comprises a plurality of push rods disposed in certain ones of the slots in the periphery of a spline shaft. One end of each rod bears against a pressure plate which is operatively connected to the friction discs of a clutch. The other end of each push rod abuts directly, or through a pressure plate, a camming surface of a rotary cam that is journalled on the axis of the shaft. The arrangement is such that rotary movement of the cam causes the pins to be moved in an axial direction along the shaft to force the friction members of the clutch into engagement.

DESCRIPTION OF THE DRAWINGS

FIG. 1 is a vertical transverse section taken through the centerline of a clutch with which the clutch actuating mechanism of the present invention is associated.

FIG. 2 is a section taken along lines 2—2 of FIG. 1.

FIG. 3 is an enlarged fragmentary section, similar to a portion of FIG. 1, showing a second embodiment of the actuating mechanism of the present invention.

DESCRIPTION OF A PREFERRED EMBODIMENT

In FIG. 1 the reference numeral 10 indicates generally a clutch adapted to connect a drive sprocket 12 in driving engagement with a driven sprocket 13. The sprocket 12 is driven by a suitably powered chain, and the driven sprocket 13 is mounted on a tubular spline shaft 14 and is fixed against axial movement along the shaft by snap rings 15 and 16. The clutch, spline shaft and the two sprockets may be considered to be part of a power transfer mechanism adapted to be mounted on a vehicle and to deliver power to an accessory or to the traction wheels of the vehicle.

As seen in FIG. 1, the spline shaft 14 is rotatably mounted by means of roller bearings 18 on a cylindrical rod 20 that is locked by nuts 21 in stationary position between two spaced mounting plates 22 and 23 which are secured in fixed spaced relation on a vehicle. The plates may be parts of apparatus mounted on the vehicle, as for instance, a tank, or they may be secured to the chassis or other fixed members of the vehicle. Thrust bearing units 25a and 25b are mounted between each end of spline shaft 14 and the adjacent mounting plate. Bearing unit 25a is held in radially spaced relation to the cylindrical rod by a spacer 26.

The clutch 10 comprises a drive member 30 that is secured, as by bolting, to the body of the sprocket 12 and has a plurality of fingers 30a projecting through spaced holes 31 in the sprocket 12 near its periphery. The sprocket 12 is mounted on the outer race of a bearing 33 that is positioned on the spline shaft 14. A snap ring 34 locates the sprocket 12 on the bearing. The clearance, or space, between the friction rings 50 and discs 54 when the clutch is in a disengaged condition is determined by the axial position of the bearing 33 and the shaft 14. The position of the bearing on the shaft 14 is controlled by an internally threaded ring 36 that is engaged on a threaded end portion of the spline shaft 14. A key 38, in the form of a flat strap member, is secured to the ring 36 with its lower end disposed in one of the longitudinal slots of shaft 14 to prevent unauthorized rotation of the ring. A screw 40, which passes through a slot 41 in the key, locks the key to the ring. In order to adjust the position of the ring on the shaft and thereby adjust the position of bearing 33, the screw is backed away from the key; the key is raised so that its lower end is out of the slot in the shaft; the ring is adjusted to the desired position on the shaft; and the key is lowered into the nearest slot therebelow and locked to the ring.

Four friction rings 50 are disposed within the circle defined by the fingers 30a of the drive member 30 and, as seen in FIG. 2, each friction ring 50 has a recess 50a that receives one of the fingers. Thus, when the drive member 30 is rotated, it drives the four rings 50 which are relatively thin steel members and have rings of friction material glued to their opposite faces.

A disc 54 (FIG. 1) is disposed between each pair of adjacent friction rings, and each disc has radially inner projections 54a disposed in the slots of the spline shaft 14. A pressure plate 56, which abuts the end friction ring 50, is positioned at its central area in slidable, splined relation with shaft 14. A wave-type annular spring washer 58 is disposed between the central portions of adjacent discs 54, between the bearing 33 and the adjacent disc 54, and between the pressure plate 56 and the adjacent disc 54.

A clutch engaging mechanism 60 is mounted adjacent the side mounting plate 23. This mechanism includes a ring 61 bolted to the inner face of plate 23 and carrying three angularly spaced rollers 62 (one only being shown). Each roller 62 rides on a camming surface 65a formed on a cam ring 65 that is mounted on the outer race of a bearing 66 slidably carried by shaft 14. A linkage 68, which may be actuated from a remote position, is secured to the cam ring 65 for rotating the ring. The camming surface 65a is so designed that, when the ring 65 is rotated through a predetermined number of degrees around its axis, inclined portions of the camming surface travel over the rollers 62. As a result, the cam ring 65 and the bearing 66 is forced toward the left. The leftward motion of the bearing is transmitted to the pressure plate 56 by a pressure washer 70, that is disposed in slidable splined relation on shaft 14, and by three pins 72 (FIG. 2) which lie in slots of the spline shaft 14 between the washer 70 and the pressure plate 56. As seen in FIG. 2, the sprocket 13 has only three radially inward projections 13a that engage in slots of the spline shaft, and the three thrust pins 72 are disposed in the other three slots of the shaft.

It will be evident that, when the three thrust pins move toward the left, they shift the pressure plate 56 to the left, causing that plate to shift the friction rings and the drive discs into tight friction engagement as shown in FIG. 1. Thus a drive connection is established from sprocket 12 to the sprocket 13 through the drive member 30, the friction rings 50, the drive discs 54, and the spline shaft 14. When the linkage 68 is actuated manually, or by a spring return mechanism, to rotate the cam ring back to its original position, the wave-type springs 58 separate the drive discs and the friction rings, and move the pressure plate 56, the thrust pins 72 and the washer 70 to the right to disengage the clutch and to keep the camming surface 65a in contact with the roller 62.

The camming surface 65a is preferably provided as three separate angular spaced cam tracks each having a short angular extent and each being independently engaged with a roller 62 that is mounted in fixed position on ring 61. The tracks have identical, slowly rising surfaces and their throws are such that a predetermined angular movement of the cam ring will cause the necessary axial shift of the friction rings and drive discs into engagement.

It should be particularly noted that the driven sprocket 13 is allowed to maintain its axial position on the shaft 14 even though it is located between the clutch and the cam ring. This is of particular importance in chain drives since axial movement of the sprocket can adversely effect the engagement of the chain on the sprocket. The use of axially moving thrust pins that pass freely underneath the driven sprocket make this advantageous result possible.

In FIG. 3, a second embodiment of the invention is illustrated. The members of this embodiment, that are generally identical to members of the FIG. 1 embodiment, have been given the same reference numerals as their corresponding parts in FIG. 1 followed by a prime designation. Accordingly, it will be noted that in the FIG. 3 embodiment there is no thrust washer between the bearing 66' and the thrust pins 72'. No splines are provided at the right hand end of shaft 14 and the bearing 66' which is smaller in diameter than bearing 66, is slidably disposed on a cylindrical surface of the shaft 14 in abutment with the three thrust pins 72'. Thus, when the cam ring 65' is moved toward the left, the bearing 66' presses directly on the thrust pins 72' to force them against the pressure plate 56'.

It will be understood that modifications and variations may be effected without departing from the scope of the present invention as defined by the appended claims.

What is claimed is:

1. A clutch mechanism comprising a rotatable shaft, a powered drive member rotatably mounted on said shaft, clutch means for connecting said drive member in driving engagement with said shaft, said clutch means including a plurality of members movable axially of said shaft to connect said drive member to said shaft, a rotary actuating mechanism mounted for rotation on said shaft and for axial movement therealong, a driven member keyed to said shaft and disposed in fixed position axially of said shaft between said actuating mechanism and said clutch means, and thrust means connecting said actuating mechanism to said clutch means so that rotation of said actuating mechanism causes engagement of said clutch means without axial movement of said driven member, said shaft having longitudinal grooves therein underlying portions of said driven member and said thrust means including at least one elongate rigid member disposed in one of said grooves.

2. A clutch mechanism according to claim 1 including a thrust ring in abutting contact with said rotatable actuating mechanism and with said rigid thrust member whereby axial movement of said actuating member causes axial movement of said thrust member to engage said clutch means.

3. A clutch mechanism comprising spaced support members, a shaft rotatably supported between said members, said shaft having a plurality of longitudinal slots therein, a powered input member rotatably mounted on said shaft, a plurality of drive rings driven by said powered member, a plurality of discs keyed to said shaft and mounted for axial movement thereon, a peripheral portion of each disc being disposed between adjacent rings, an actuating mechanism mounted for rotation about the axis of said shaft, a power output member keyed to said shaft between said input member and said actuating mechanism, and motion transmitting members disposed in selected ones of said slots and operatively connected to said discs and to said actuating mechanism to move said discs into engagement with said rings to drivingly connect said input member to said output member.

4. A clutch mechanism comprising spaced support members, a shaft rotatably supported between said members, said shaft having a plurality of longitudinal slots therein, a powered input member rotatably mounted on said shaft, a plurality of friction members, certain of said friction members being in driven engagement with said input member and other friction members being keyed to said shaft, an actuating mechanism mounted for rotation about the axis of said shaft, a power output member keyed to said shaft between said input member and said actuating mechanism, and motion transmitting members disposed in selected ones of said slots and operatively connected between said actuating mechanism and said friction members whereby partial rotation of said mechanism effects interengagement of said friction members.

* * * * *